United States Patent [19]

Rannenberg

[11] 3,731,594

[45] May 8, 1973

[54] FUNCTION GENERATOR TRANSDUCER

[75] Inventor: George C. Rannenberg, Canton, Conn.

[73] Assignee: United Aircraft Corporation, East Hartford, Conn.

[22] Filed: Feb. 25, 1971

[21] Appl. No.: 118,718

[52] U.S. Cl. ..............................92/36, 92/97, 92/99, 73/407 R

[51] Int. Cl. ..............................G01l 7/08

[58] Field of Search ..............................73/407 R, 407 PR, 73/406, 410; 92/99, 98 R, 98 D, 36, 97

[56] References Cited

UNITED STATES PATENTS

| | | | |
|---|---|---|---|
| 3,348,417 | 10/1967 | Hitzelberger | 73/407 PR |
| 2,185,971 | 1/1940 | Achtel et al. | 73/410 |

*Primary Examiner*—Donald O. Woodiel
*Attorney*—Norman Friedland

[57] ABSTRACT

A force equal to a function of a sensed pressure is obtained by combining a stroking and nonstroking piston by use of diaphragms sensing a pressure. One of the pistons carries a variable area surface which varies the effective area of the diaphragm forming a part of the other piston.

6 Claims, 7 Drawing Figures

INVENTOR
GEORGE C. RANNENBERG
BY Norman Friedland
ATTORNEY

CABIN
120
101
100
102
122
110
104
124
112
106
126
120
108
118
114
FORCE

FUNCTION GENERATOR TRANSDUCER

BACKGROUND OF THE INVENTION

This invention relates to pressure transducers and particularly to the type that incorporates a diaphragm that senses a pressure or pressures and converts it into a force which is indicative of a function of that pressure or pressures. As is well known in the art, the area of a sensing diaphragm or piston may be changed with its stroke by the use of a conical or dish-shaped surface which is in sliding relation to the diaphragm. It is also well known in the art that two or more diaphragms or pistons may be utilized on the same shaft or plunger to generate a signal which is indicative of the sum of two or more sensed pressures. Obviously, if the product of two sensed signals is desired, such a device is unsatisfactory.

In the first prior art device described above, the output is a displacement or stroke which is a function of the pressure sensed. In the second prior art device described above, the output is a force which is directly proportional to the algebraic sum of the pressures sensed. Also, it will be appreciated that in the second prior art device where a single diaphragm is encased in a cylinder, the output manifested from the pressure is on a 1 to 1 ratio, i.e., the force is directly proportional to the pressure. If the pressure doubles, the force doubles, etc.

The problem solved by this invention is providing a force signal by utilizing a variable area conical or dish-shaped piston combined with a nonstroking piston. By this means I have found that I can generate a signal which is an exponential function of the pressure sensed rather than just the algebraic sum.

SUMMARY OF INVENTION

A primary object of this invention is to provide a pressure transducer which produces a signal which is indicative of an exponential function of the pressure being sensed where that function is something other than being proportional thereto.

A still further object of this invention is to provide a movable conical or dish-shaped piston in combination with a sensing piston to vary the area of the sensing piston to produce a force indicative of an exponential function of the pressure being sensed.

A still further object of this invention is to provide multiple of sensing pistons including the variable-area-no-stroke piston combination to provide a transducer which will produce a signal indicative of the product of two signals being sensed.

Other features and advantages will be apparent from the specification and claims and from the accompanying drawings which illustrate an embodiment of the invention.

DESCRIPTION OF THE PREFERRED EMBODIMENT

It is to be understood that the terms piston and diaphragm as used herein are interchangeable and have for the purpose of this description the same meaning.

Figure 1:
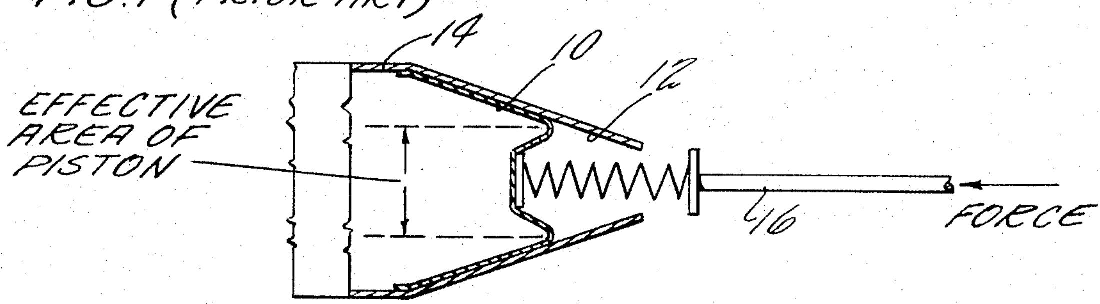
FIG. 1 is shown partially in schematic and partially in section illustrating a prior art device.
Figure 2:
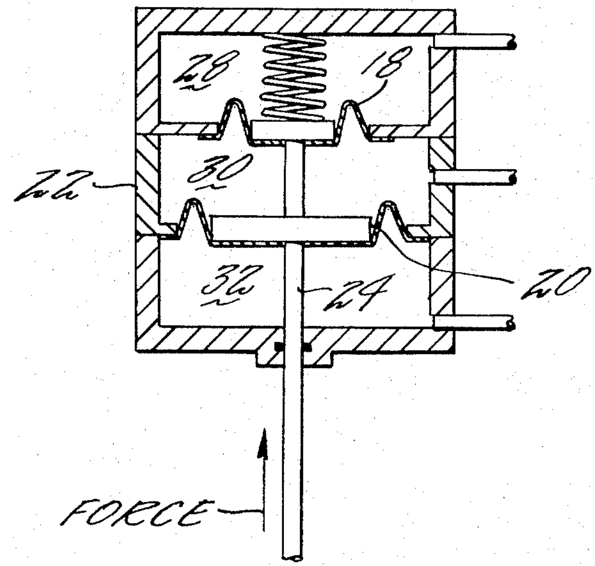
FIG. 2 is a view partly in section and partly in schematic illustrating another type of prior art device.

FIGS. 1 and 2 illustrate two typical prior art devices wherein FIG. 1 illustrates a transducer having a variable area diaphragm and FIG. 2 illustrates a transducer which has a constant area diaphragm and a special case where forces of two pistons are added to a common plunger. As can be seen by referring to FIG. 1, as flexible diaphragm 10 rides against the conical surface 12 of housing 14, its effective area changes such that the displacement of plunger 16 would be indicative of a function of the pressure difference applied across the diaphragm 10. It is apparent that as the pressure behind the diaphragm 10 increases, the force output will increase but at some factor less than one since the effective area will decrease by virtue of the conically shaped cooperating wall.

In the other prior art device (FIG. 2), pistons 18 and 20 supported transversely in housing 22 cooperate with the same shaft 24 producing a force which is indicative of the sum of the pressures applied across diaphragms 18 and 20. Looking at each diaphragm individually, it will be appreciated that when the pressure behind the diaphragm changes, say doubles, the force output of that diaphragm likewise doubles since the area remained constant. The device shown in FIG. 2 may, for example, be utilized in many control installations where a force proportional to the sum of two pressures is desired.

Figure 3:
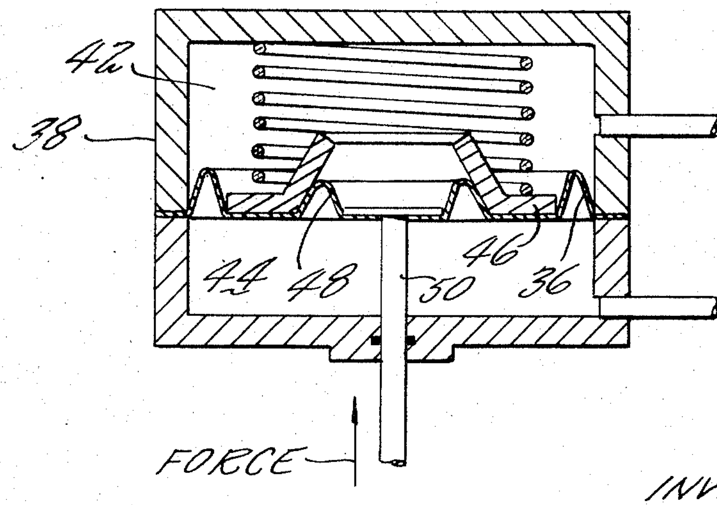
FIG. 3 is a view partly in section and partly in schematic illustrating the details of the present invention.

The inventive concept can best be understood by referring to FIG. 3 which shows diaphragm 36 extending transversely in housing 38 for defining therewith chambers 42 and 44. Attached to diaphragm 36 is a conical or dish-shaped member 46 which is adapted to move axially depending on the pressure difference applied across it. Suitably secured to member 46 is the non-stroking diaphragm 48 which is centrally attached to plunger 50 and is virtually nonmovable. The change in pressure drop applied across piston 46 moves it axially relative to piston 48 which remains virtually rigid. Obviously, the movement of piston 46 varies the effective area of diaphragm 48.

Unlike the prior art devices, the force manifested is some exponential function of the sensed pressure. Where the prior art transducers (FIGS. 1 and 2) manifest a force which is proportional to pressure to a power of one or less, the invention (FIG. 3) manifests a force proportional to pressure to a power of one or more. Thus, as the area of diaphragm 48 increases with increase of pressure in chamber 44, the force manifested obviously increases at a higher rate than the pressure.

Figure 4:
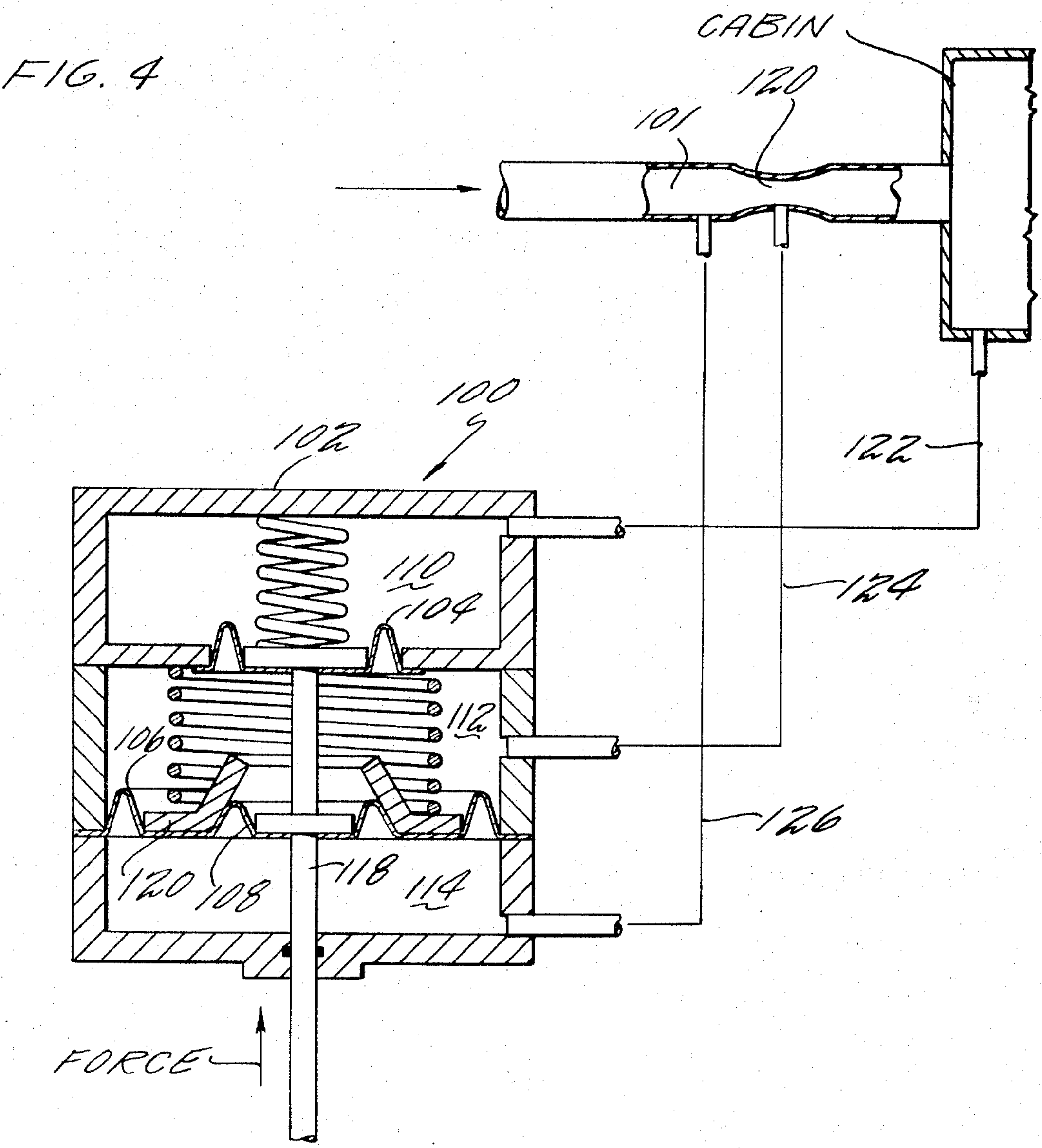
FIG. 4 is a view partly in section and partly in schematic illustrating an embodiment of the invention.

FIG. 4 exemplifies a specific use of the inventive concept where it is adapted as a flow control controlling the flow of air into a cabin or compartment in an aircraft. The transducer, generally illustrated by numeral 100, serves to produce a signal which is indicative of the weight flow of air being transmitted through pipe 101. For the purpose of this description the air in pipe 101 is conditioned and being supplied to the cabin (not shown) of an aircraft.

Transducer 100 is formed from casing 102 subdivided by diaphragms 104 and 106 and 108 into three subcompartments 110, 112 and 114. According to the inventive concept, diaphragms 106 and 108 are mounted in side-by-side relationship to form a stroke-no-stroke piston. That is, diaphragm 106 is capable of moving axially relative to the virtually stationary diaphragm 108. It being noted that diaphragms 106 and 108 can be made individually or unitary but that the central portion of diaphragm 108 remains virtually fixed and serves to apply a force to plunger 118 affixed thereto. The conically shaped member 120 is mounted on diaphragm 106 and moves therewith to change the effective area of diaphragm 108. This produces a signal which is a function of the pressure difference across the stroke-no-stroke piston. Diaphragm 104, also centrally affixed to plunger 118, serves to add an additional force indicative of the difference pressures applied thereacross. To obtain the flow signal pressure downstream of venturi 120 or cabin pressure is applied to chamber 110 via line 122, pressure at the throat of the venturi is applied to chamber 112 via line 124, and pressure at the inlet of the venturi is applied to chamber 114 via line 126. Thus, the transducer 100 operates to the following equation:

$W \approx (P \text{ venturi}) + f(\Delta P \text{ venturi})$ where P is pressure in pounds per square inch (gauge), $f$ is a function of, $\Delta$ is a difference and W is weight flow in pounds per cubic feet. By properly shaping the dish or conical surface of stroking piston 106, it is possible to have the device operate to the equation:

$$W \approx (P \text{ venturi})(\Delta P \text{ venturi})$$

Thus, the output of plunger 118 serves to produce a signal indicative of the product of the pressures sensed which is indicative of the weight flow. This signal, in turn, may be utilized to control the flow in duct 101 for supplying air to the cabin in a suitable manner to satisfy the above equation.

Figure 5:
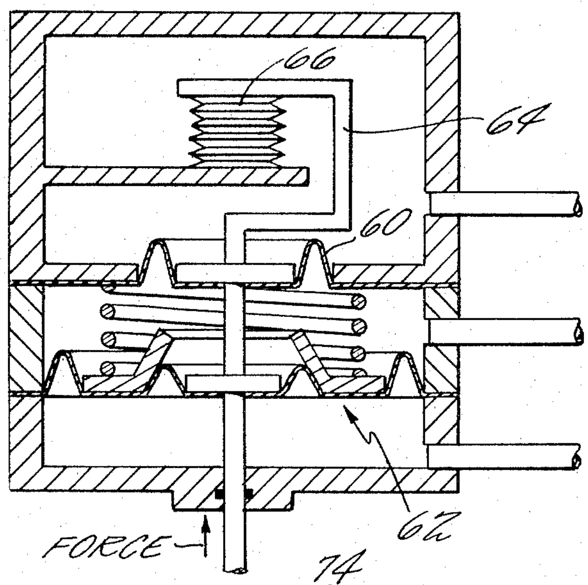
FIG. 5 is a view partly in section and partly in schematic illustrating another embodiment of the invention.
Figure 6:
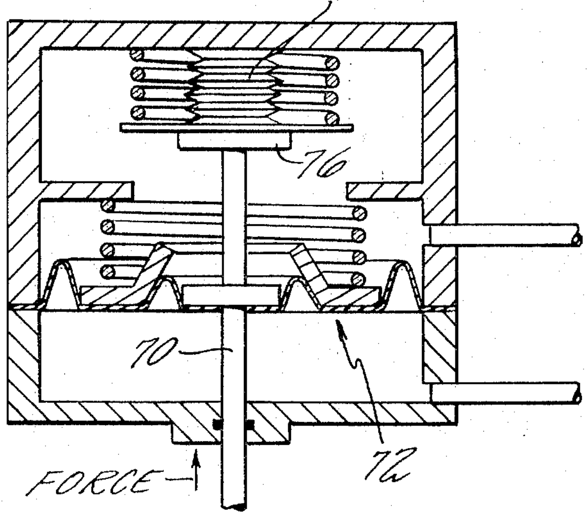
FIG. 6 is a view partly in section and partly in schematic illustrating still another embodiment of this invention.
Figure 7:
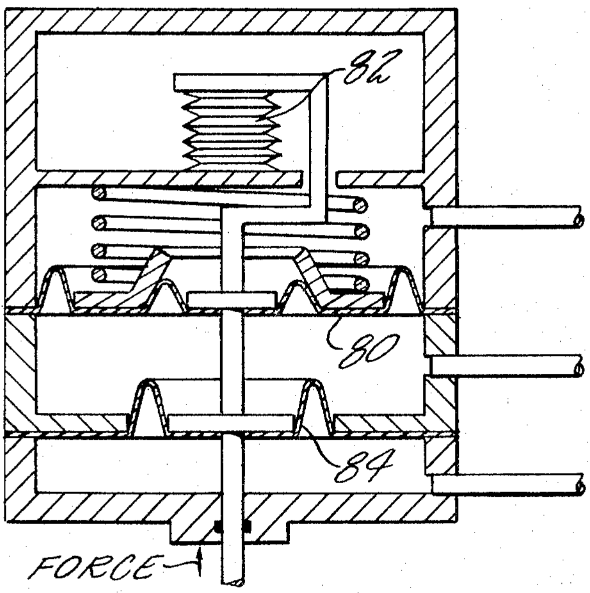
FIG. 7 is a view partly in section and partly schematic illustrating another embodiment of this invention.

FIGS. 5, 6, and 7 show alternate embodiments exemplifying transducers that serve to generate signals which are capable of achieving arbitrary functions of the pressures sensed. While the embodiments disclosed in FIGS. 3, 4, 5, and 6 are particularly suited for airflow controls, the concept, as will be obvious to one skilled in this art, has applicability for other areas such as fuel controls, area controls, stator vane controls and the like.

FIG. 5 schematically shows a transducer for obtaining a force indicative of an arbitrary function of the pressures applied across piston and the stroke-no-stroke piston combination generally illustrated by numeral 62. The output signal can be referenced to an absolute value by having the common plunger 64 bear against evacuated bellows 66.

FIG. 6 is another schematic of the hardware arrangement where the signal is not either the sum of or the product of the pressures sensed, but produces a force signal on plunger 70 that is indicative of an arbitrary function of the pressure difference acting across the stroke-no-stroke piston 72. This likewise may be referenced to absolute pressure by utilizing evacuated bellows 74 bearing against platen 76 affixed to the end of plunger 70.

FIG. 7 is still another schematic of the hardware arrangement where the stroke-no-stroke piston 80 is located between the evacuated bellows 82 and sensing piston 84.

It should be understood that the invention is not limited to the particular embodiments shown and described herein but that various changes and modifications may be made without departing from the spirit or scope of this novel concept as defined by the following claims.

I claim

1. A transducer having a casing having inner walls defining an enclosed chamber,
   - a diaphragm having a central flexible convolute portion surrounded by an outer flexible convolute portion and separated therefrom by an annular spring biased dish-like shaped member supported by the diaphragm,
   - said member having a conical wall facing said central portion,
   - said diaphragm extending across said casing for dividing said enclosed chamber into a pair of subchambers each including means for admitting fluid pressure,
   - a plunger centrally attached to the central portion of the diaphragm and extending through one of the inner walls of the casing, whereby upon the admission of two different pressures into said subchambers the central convolute portion contacts said conical wall varying the effective area thereof to effectuate a magnification of force applied to said plunger due to the differential pressure.

2. A transducer as claimed in claim 1 including another diaphragm being in parallel spaced relationship to said diaphragm and defining with the inner walls of said casing an additional subchamber having means for admitting fluid pressure, and said plunger being centrally attached to said other diaphragm.

3. A transducer as claimed in claim 2 including another spring acting on said other diaphragm biasing it in the same direction that said spring biases said diaphragm.

4. A transducer as claimed in claim 1 including a bellows in said additional chamber, said plunger having an extension portion operatively connected to said bellows and biased thereby.

5. A transducer as claimed in claim 1 including a bellows disposed in one of said subchambers, an extension portion in said plunger operatively connected to said bellows to bias said plungers.

6. A transducer as claimed in claim 1 including an additional diaphragm extending across said inner walls of said casing and parallelly spaced from and below said diaphragm for defining an additional subchamber having an opening for admitting fluid pressure therein, a bellows disposed above said diaphragm, an extension portion on said plunger operatively connected to said additional diaphragm and said bellows.

* * * * *